(12) United States Patent
Wendt et al.

(10) Patent No.: US 6,771,142 B1
(45) Date of Patent: Aug. 3, 2004

(54) NETWORK COUPLER

(75) Inventors: Matthias Wendt, Würselen (DE); Wolfgang Budde, Aachen (DE); Peter Fuhrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/660,917

(22) Filed: Sep. 13, 2000

(30) Foreign Application Priority Data

Sep. 14, 1999 (DE) .......................................... 199 43 895
Dec. 14, 1999 (DE) .......................................... 199 60 470

(51) Int. Cl.[7] ............................. H01P 5/12; H01F 27/28
(52) U.S. Cl. ...................................... 333/118; 336/232
(58) Field of Search ............................... 327/168, 303; 336/232, 175, 182; 333/118; 363/126; 307/246

(56) References Cited

U.S. PATENT DOCUMENTS

| | | | | |
|---|---|---|---|---|
| 4,028,559 A | * | 6/1977 | Larner | 307/303 |
| 4,058,742 A | * | 11/1977 | O'Brien | 307/260 |
| 4,080,585 A | * | 3/1978 | Molthen | 336/200 |
| 4,454,430 A | * | 6/1984 | Miller | 307/265 |
| 4,965,712 A | * | 10/1990 | Duspiva et al. | 363/126 |
| 5,168,440 A | * | 12/1992 | Spreen | 363/246 |
| 5,781,093 A | * | 7/1998 | Grandmont et al. | 336/232 |
| 5,789,959 A | | 8/1998 | Dielacher et al. | 327/303 |

* cited by examiner

Primary Examiner—Robert Pascal
Assistant Examiner—Dean Takaoka
(74) Attorney, Agent, or Firm—Aaron Waxler

(57) ABSTRACT

For a network coupler for network users in a network comprising at least two lines, a simultaneous data and energy transfer is ensured in that the network coupler is formed in such a way that it is suitable for data transfer via the two lines (1, 2) of the network and for coupling out energy from the two lines (1, 2) of the network to which a terminal of a voltage source is coupled, in that the network coupler symmetrically couples energy into and/or out of the two lines (1,2), in that the network coupler couples the data symmetrically, differentially and inductively or capacitively into and/or out of the two lines (1, 2), and in that the network coupler symmetrically terminates the two lines (1, 2).

3 Claims, 2 Drawing Sheets

NETWORK COUPLER

BACKGROUND OF THE INVENTION

The invention relates to a network coupler for network users in a network comprising at least two lines.

Network couplers are generally used for coupling in and coupling out data transferred via a network. They thus establish the connection between a network user and the network. Data supplied by a network user are coupled into the network by means of the network coupler. Conversely, data transferred through the network are coupled out by means of the network coupler and made available to the network user.

Known network couplers are limited to coupling in and coupling out data.

SUMMARY OF THE INVENTION

It is an object of the invention to provide a network coupler which is not only suitable for data transfer but also for energy transfer.

According to the invention, this object is achieved in that the network coupler is formed in such a way that it is suitable for data transfer via the two lines of the network and for coupling out energy from the two lines of the network to which a terminal of a voltage source is coupled, in that the network coupler symmetrically couples energy into and/or out of the two lines, in that the network coupler couples the data symmetrically, differentially and inductively or capacitively into and/or out of the two lines, and in that the network coupler symmetrically terminates the two lines.

For the purpose of data transfer, the data are transferred symmetrically and differentially on the two lines of the network. For example, a data bit transferred through the network lines is, however, transferred with opposite polarities through the two lines. The network coupler couples in or couples out these data inductively or capacitively, as well as symmetrically and differentially.

Moreover, the network coupler is also suitable for energy transfer. A terminal of a voltage source is coupled to the two lines of the network. The network coupler is formed in such a way that it can couple out this energy from the two lines. This is effected symmetrically, i.e. the current drawn by the network coupler from the lines of the network is equally large in the two lines. This is achieved in that the load represented by the network coupler with respect to the two lines of the network is equally large on the two lines, so that the two lines are symmetrically terminated.

It is thereby achieved, on the one hand, that both data and energy transfer is made possible via the network coupler, or via the two lines of the network. Due to the strictly symmetrical coupling-out of supply currents on the two lines and the symmetrical differential transfer of data on the two lines, it is achieved that the data transfer is not disturbed by disturbances on the two network lines, which disturbances may have been caused, for example, by the energy distribution.

Such network couplers can be constructed in a relatively simple and, hence, low-cost way.

An embodiment of the network coupler according to the invention, is characterized by such a simple structure but can nevertheless fulfill the above-mentioned conditions, in which the network coupler comprises a first primary coil having a first terminal which is coupled to the first line of the network, and a second primary coil having a first terminal which is coupled to the second line of the network, and in which the two second terminals of the first primary coil and the second primary coil are interconnected at a power supply point which supplies a power supply voltage, and in which the network coupler comprises a secondary coil by means of which data can be coupled into or out of the two lines of the network, and in which the two primary coils and the secondary coil of a core are magnetically coupled together. The two first and second primary coils which have the same resistance or impedance are used, on the one hand, for coupling out energy from the two lines of the network. This is effected symmetrically, i.e. currents which flow in response to the coupling-out of energy are divided into equal currents on the two lines.

The first primary coil and the second primary coil are magnetically coupled to a secondary coil. In the secondary coil, a voltage is only induced when a differential current flows between the two first terminals of the first and the second primary coil. On the other hand, currents of the same sign in the two windings do not lead to a voltage induction in the secondary coil. It is thereby achieved that data differentially transferred through the two lines lead to a voltage induction in the secondary coil but are not accompanied by disturbances taking place at the same sign, which disturbances may occur, for example, due to fluctuations of the power supply voltage as a result of a varying load.

To achieve the symmetrical coupling-out as described above, the two primary coils are advantageously formed in such a way that a current flowing through the power supply point is divided into two equally large currents flowing in the two lines of the network. In the simplest case, this can be achieved by manufacturing the windings of the same material and giving them the same cross-section, length and the same number of turns.

The ratio of turns between the number of turns of the primary coils and the number of turns of the secondary coil defines the voltage ratio of the differential voltage at the terminals of the secondary coil. It has been proved to be advantageous, as in a further embodiment of the invention that the secondary coil has a higher number of turns than the primary coils.

The primary coils may be constructed in a relatively simple manner in that they are formed, for example, in further embodiments of the invention, as metal strips and may have a number of turns of n=1.

A further advantageous construction of the coils is that they are provided as a printed circuit on a two-layer plate on which both the two primary coils and the secondary coils are printed as conductor tracks.

These and other aspects of the invention are apparent from and will be elucidated with reference to the embodiments described hereinafter.

DESCRIPTION OF THE PREFERRED EMBODIMENTS

Figure 1:
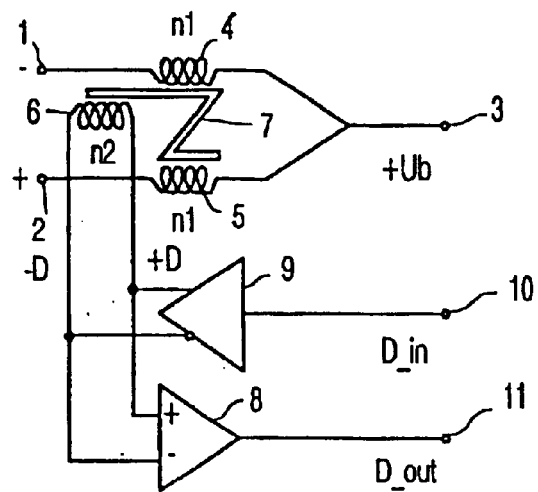
FIG. 1 is a circuit diagram of a network coupler according to the invention.

FIG. 1 is a circuit diagram of a network coupler according to the invention.

The network coupler couples data into and out of lines 1 and 2, respectively, of a network, as well as a power supply terminal which is coupled to both lines 1 and 2. To this end, the network coupler should make available a power supply voltage +Ub at a power supply point 3, which power supply voltage is coupled out of the two lines 1 and 2 of the network.

To this end, two primary coils 4 and 5 are provided which, in the ideal case, have the same construction, i.e. consist of the same material and have the same cross-section as well as the same number of turns. In any case, the two primary coils 4 and 5 must have the same resistance and impedance.

The first terminals of the two primary coils 4 and 5 are coupled to one of the lines 1 and 2, respectively, of the network. The second terminals are connected to the common power supply point 3.

Due to this special construction of the network coupler, it is achieved that power supply currents flowing at the power supply point 3 are divided into two equally large currents which flow in the primary coils 4 and 5 and hence in the two lines 1 and 2 of the network. Thus, a strictly symmetrical load of the two lines 1 and 2 with power supply currents is achieved.

Data, which are transferred symmetrically and differentially on the two lines may also be transferred through the two lines 1 and 2 of the network.

To couple out these data, the network coupler shown in FIG. 1 comprises a secondary coil 6 which is magnetically coupled to the two primary coils 4 and 5 by means of a magnetic coupling 7.

A voltage is only induced in the winding of the secondary coil 6 when differential currents occur in the primary coils 4 and 5. This is exactly the case when data are symmetrically and differentially transferred on the two lines 1 and 2 of the network. Then, there is a corresponding induction of the voltage in the secondary coil 6.

Conversely, the same applies to coupling in data which can be coupled in a differential form into the two lines 1 and 2 of the network by means of the primary coil 2 and the coupling 7 and the two primary coils 4 and 5.

To couple out the data, a first terminal of the secondary coil 6, which conveys the data with negative polarity, is connected to an inverting input of an amplifier 8. The second terminal of the secondary coil 6 is coupled to a second non-inverting input of the same amplifier. The data can thus be evaluated by means of such an amplifier 8. At the output, the amplifier 8 provides the corresponding data at a terminal 11 which is denoted in the Figure by D__out.

To couple data into the two lines 1 and 2 of the network by means of the network coupler, an amplifier 9 is provided, whose non-inverting input is coupled to the second terminal of the secondary coil 6 and whose inverting output is coupled to the first terminal of the secondary coil 6. The data applied to the input of the amplifier from a second connection point 10 are thus made available as signals +D and −D of different polarities by means of the amplifier 9 and transferred via the primary coil 2 and the magnetic coupling 7 to the primary coils 4 and 5, so that corresponding symmetrical differential voltage signals are coupled into the lines 1 and 2 of the network.

In spite of the relatively simple construction of the network coupler shown in FIG. 1, it allows both a transfer of data and a supply of energy. Due to the strictly symmetrical coupling-out of currents of the energy supply, the data are not disturbed. Conversely, the data are transferred differentially so that the power supply voltage is not disturbed.

The network coupler thus fulfills all requirements which are to be imposed for a simultaneous undisturbed data transfer and energy transfer via two lines of a network.

Figure 2:
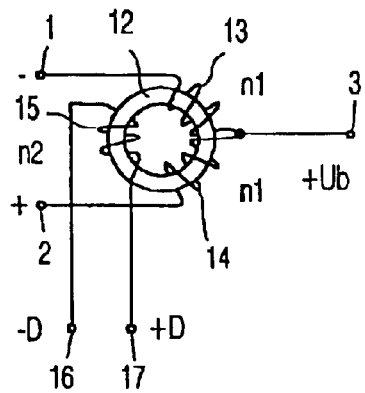
FIG. 2 shows diagrammatically the construction of a network coupler with two primary coils and one secondary coil which are magnetically coupled together.

FIG. 2 shows diagrammatically how the two primary coils 4 and 5, the secondary coil 6 and the magnetic coupling 7 shown in FIG. 1 can be realized in practice.

To this end, FIG. 2 shows a core 12 which is capable of conveying a magnetic flux.

Two primary coils 13 and 14 are provided which, in the embodiment shown in the Figure, have three windings each. A secondary coil 15 is wound around the same core 12, which coil has also three windings in this embodiment The two terminals of the secondary coil 15 supply the positive and negative data signals +D and −D, respectively. The first terminals of the two primary coils 13 and 14 are connected to the two lines 1 and 2 of the network and their second terminals are jointly connected to the power supply point 3.

FIG. 2 shows that the arrangement of the windings with their magnetic coupling as shown in FIG. 1 can be very easily realized by means of three windings around a common magnetizable core.

In FIG. 2, the two primary coils 13 and 14 have a number of turns of n1, whereas the secondary coil has a number of turns of n2. The ratio of turns between 2.n1 and n2 determines the voltage ratio at the two terminals 16 and 17 of the secondary coil 15, at which the positive data signal +D and the negative data signal −D are made available.

To achieve a sufficiently high voltage at this point, it has been proved to be advantageous to choose n2 to be larger than n1.

Since, moreover, half the power supply current flows through the windings n1 of the two primary coils 4 and 5, it is advantageous to give them a relatively large cross-section.

Figure 3:
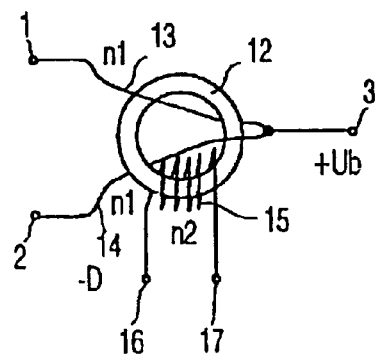
FIG. 3 is a schematic drawing of a network coupler as shown in FIG. 2, in which the number of turns of the primary coils was chosen to be 1.

FIG. 3 shows diagrammatically, and similarly as in FIG. 2, which of the two primary coils 13 and 14 have only one turn n1=1. However, the secondary coil 15 has a number of turns of n2=5.

It is achieved by this ratio of the number of turns that the differential voltage at the terminals 16 and 17 of the secondary coil 15 is relatively large.

FIG. 4 shows a first concrete embodiment of a network coupler in which the ratio of the number of turns is chosen to be the ratio as shown diagrammatically in FIG. 3.

Figure 4A:
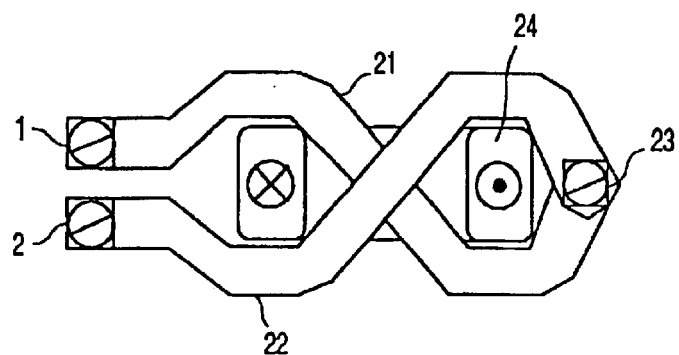
FIG. 4 shows a first realization of a network coupler with coils as shown in FIG. 3.

Two metal strips 21 and 22 are provided, which have a relatively large cross-section and are connected to a common power supply point 23. As is shown in FIG. 4A, the two metal strips 21 and 22 run cross-wise through a magnetic core 24 and thus each constitute a coil with one turn.

Figure 4B:
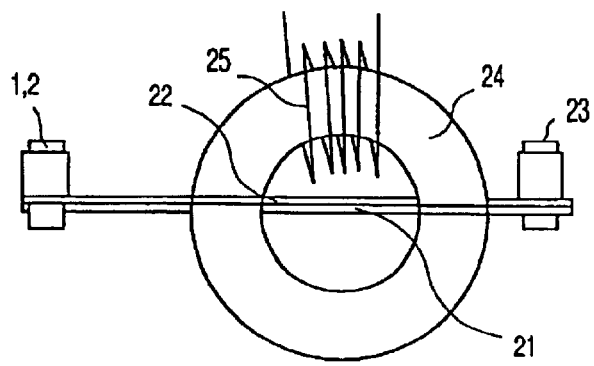

As is shown in FIG. 4B, a secondary coil 25 is wound around this magnetic core 24.

The embodiment shown in FIG. 4 has the advantage that a relatively high differential voltage is induced in the secondary coil 25 because of the ratio of the number of turns 2:n1 of the secondary coil 25 and the primary coils 21 and 22.

The relatively large power supply currents flowing in the primary coils 21 and 22, which currents are jointly fed to the power supply point 23, are passed through the metal strips 21 and 22 which can take up these currents without any problem.

Such an arrangement as shown in FIG. 4 may be advantageously accommodated or molded in a housing and, for example, enveloped with a synthetic material. Only the connection points 1, 2, 23 and the two terminals of the secondary coil 25 must then be led to the exterior.

The terminals may be pressed on or realized as plug connections. Particularly on the network side, a possibly low contact resistance is to be taken into account in this case in order that fluctuations of the power supply currents do not disturb the data transfer.

Figure 5A:
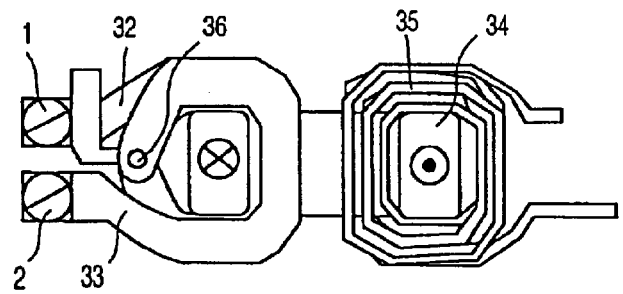
FIG. 5 shows a second realization of a network coupler with coils as shown in FIG. 3.
Figure 5B:
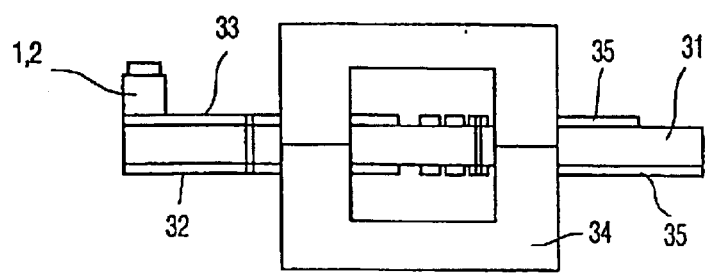

To integrate such a network coupler in an electronic apparatus, it may be advantageous to choose the second embodiment as shown in FIG. 5. In this embodiment, a two-layer plate 31 is provided, having one of the primary windings 32 and 33 on both of its sides, which windings are each wound once around the magnetic core 34 and thus have a number of turns of n1=1 each. A secondary coil 35 is also provided on both sides of the plate, which coil is wound a number of times around the magnetic core 34 via which a magnetic coupling between the two primary coils 32 and 33, on the one hand, and the secondary coil 35, on the other hand, is achieved.

In such an arrangement, the three coils can thus be jointly formed on a two-layer plate which may further simplify the construction of the network coupler.

Also in this case, it is essential that the wiring is strictly symmetrical and that particularly the two primary coils 32 and 33 ensure a symmetrical current division of the current flowing through the power supply point 36. The power supply point 36 is therefore arranged symmetrically and realized by means of a through-contact.

A plate having more than two layers may be provided, in which the power supply point 36 is advantageously provided on another layer than the primary windings 32 and 33.

The magnetic core 34 may advantageously consist of two parts which are placed from both sides on the plate 31. Other cores may of course also be used, as is shown in FIG. 5.

The figure shows that a relatively simple realization of the network coupler according to the invention is possible, allowing both a data transfer and an energy transfer through two lines of a network without any mutual disturbance.

What is claimed is:

1. A coupler having a core, said core having a closed perimeter of a thickness, said coupler also including two primary windings and a secondary winding, the two primary windings crossing within the perimeter of said core, the secondary winding being wrapped plural times around said thickness of said perimeter without crossing said primary windings, said secondary winding being comprised of wire that is a plurality of times thinner than said primary windings, said secondary winding being wrapped around said core a larger number of times than the primary windings combined, wherein the primary coils are wired symmetrically to induce identical currents, and wherein the primary and secondary coils are perpendicular to each other as arranged on the core.

2. The coupler of claim 1 wherein the number of turns in the secondary coil is at least five times the number of turns in the primary coils.

3. The coupler of claim 2 wherein the primary coils are thick enough to carry power and data, and wherein the secondary coil is not thick enough to carry the data.

* * * * *